H. L. LYON.
Cotton-Scraper.
No. 227,802. Patented May 18, 1880
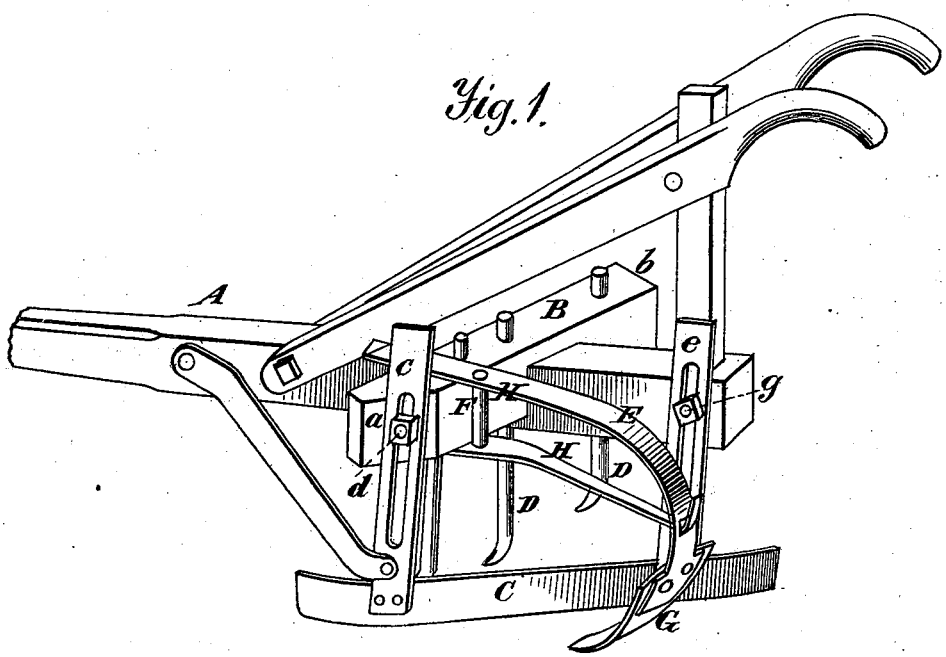
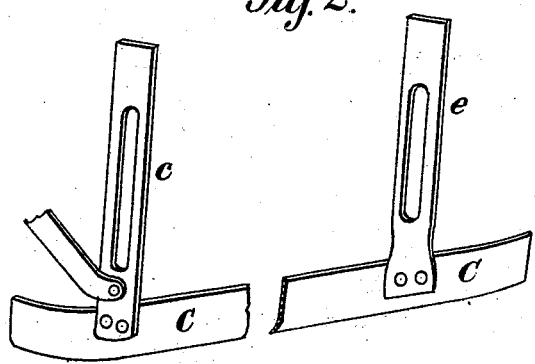
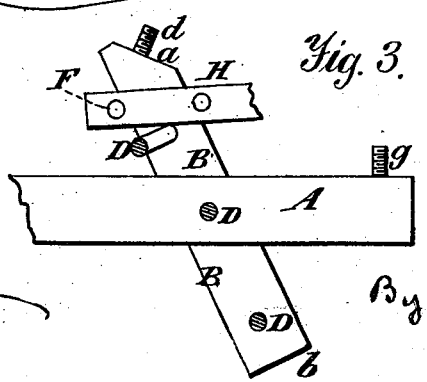
Witnesses.
A. Ruppert,
Alex. Scott
Inventor.
H. L. Lyon.
By Theo. Mungen.
Atty.

UNITED STATES PATENT OFFICE.

HENRY L. LYON, OF HAMPTON, ARKANSAS.

COTTON-SCRAPER.

SPECIFICATION forming part of Letters Patent No. 227,802, dated May 18, 1880.

Application filed February 17, 1880.

*To all whom it may concern:*

Be it known that I, HENRY L. LYON, of Hampton, in the county of Calhoun and State of Arkansas, have invented certain new and useful Improvements in Cotton-Scrapers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements upon the invention for which Letters Patent of the United States were granted to J. M. P. Lyon the 17th day of January, 1871, No. 110,988, for improvement in cotton-scrapers; and it has for its object to provide for "dirting" the cotton at the same time it is harrowed and scraped. This object I attain by the mechanism illustrated in the annexed drawings.

In the drawings, Figure 1 represents a perspective view of my improved cotton-scraper and sweep attachment; Fig. 2, a detached view of the scraper proper, and Fig. 3 a detached bottom view of the head-block.

The letter A indicates the draft-beam, and B the head-block, secured thereto in any desired manner. The said head-block sets obliquely to the draft-beam, and the end $a$, to which the scraper C is secured, extends somewhat farther to the side of the draft-beam than the opposite end, $b$.

The letter D indicates a series of harrow-teeth, the forward one of which is set somewhat ahead of the others, as shown in Fig. 3 of the drawings.

The outer end of the scraper C is secured adjustably to the end $a$ of the head-block by means of a connection, $c$, and screw-bolt and nut $d$. The rear end of the scraper is similarly secured to the rear end of the draft-beam by connection $e$ and screw-bolt and nut $g$, and is bent inward, which increases the width of the cut.

The letter E indicates a detachable sweep, secured to the head-block by means of the screw-bolts F, the said sweep consisting of a shovel, G, provided with the arms H, which embrace the head-block.

The head-block may be so arranged as to bring the operating parts of the device upon either the right or left side of the beam, to suit different persons.

It will be perceived that as constructed with the obliquely-set head-block, having the end to which the scraper is secured projecting to a greater distance at the side than the opposite end, the scraper will take a wider cut, allowing the horses to walk in the furrow between the rows instead of on the side of the ridge, and also causing the scraper to cut closer to the cotton.

By setting the forward harrow-tooth ahead of the others a free passage is left between said tooth and the scraper, thus preventing choking at that point. By means of the sweep attachment the labor of one hand and one horse is dispensed with.

What I claim, and desire to secure by Letters Patent, is—

In combination with the draft-beam A, head-block B, and adjustable scraper C, the sweep G, secured to the arms H, embracing the head-block B, and held thereon by means of the bolts F, substantially as specified.

In testimony that I claim the foregoing I have hereunto set my hand.

HENRY L. LYON.

Witnesses:
WILEY J. BUNN,
THOS. E. WEBBER.